(12) United States Patent
Kopp et al.

(10) Patent No.: US 9,923,903 B2
(45) Date of Patent: Mar. 20, 2018

(54) METHOD, A SERVER AND A CLIENT PROVIDING SECURED COMMUNICATION IN A POWER DISTRIBUTION COMMUNICATION NETWORK

(71) Applicant: Alcatel Lucent, Boulogne Billancourt (FR)

(72) Inventors: Dieter Kopp, Stuttgart (DE); Klaus Stocker, Stuttgart (DE); Silke Raehmer, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 115 days.

(21) Appl. No.: 14/888,773

(22) PCT Filed: Jun. 5, 2014

(86) PCT No.: PCT/EP2014/061739
§ 371 (c)(1),
(2) Date: Nov. 3, 2015

(87) PCT Pub. No.: WO2014/202400
PCT Pub. Date: Dec. 24, 2014

(65) Prior Publication Data
US 2016/0112436 A1    Apr. 21, 2016

(30) Foreign Application Priority Data

Jun. 19, 2013    (EP) .................................... 13305825

(51) Int. Cl.
*H04L 29/06*    (2006.01)
*H04L 12/24*    (2006.01)

(52) U.S. Cl.
CPC ........ *H04L 63/108* (2013.01); *H04L 41/0809* (2013.01); *H04L 41/12* (2013.01);
(Continued)

(58) Field of Classification Search
CPC ... H04L 63/108; H04L 41/0809; H04L 41/12; H04L 63/20
(Continued)

(56) References Cited

U.S. PATENT DOCUMENTS

2010/0180016 A1    7/2010    Bugwadia et al.
2012/0323381 A1    12/2012   Yadav et al.
(Continued)

FOREIGN PATENT DOCUMENTS

WO    2012163385    12/2012

OTHER PUBLICATIONS

Fuloria, S. et al; Towards a Security Architecture for Substations; 2011 2nd IEEE PES International Conference and Exhibition on Innovative Smart Grid Technologies (ISGT Europe 2011); Manchester, UK; Dec. 5-7, 2011; IEEE, Piscataway, NJ; Dec. 5, 2011; pp. 1-6; XP032136763; DOI: 10.1109/ISGTEUROPE.2011.6162824; ISBN: 978-1-4577-1422-1.

*Primary Examiner* — Brandon Hoffman
*Assistant Examiner* — Nega Woldemariam
(74) *Attorney, Agent, or Firm* — Patti & Malvone Law Group, LLC

(57) ABSTRACT

A technique is provided that addresses how to provide secured communication in a power distribution communication network. Specifically, upon receipt of a request for an insertion of a new device to the power distribution communication network, checking a unique identifier of the new device received in the request against a list of stored new devices or suppliers stored in a data storage. Upon finding a matching entry, evaluating a predetermined device or supplier certificate against a certificate of the new device received in the request. Upon validation of the received certificate, checking to determine if the new device will fit into a predetermined network topology or relation table that
(Continued)

indicates which messages are authorized messages. Configuring the power distribution communication network to include the new device in case the new device fits into the predetermined network topology or the relation table.

15 Claims, 3 Drawing Sheets

(52) U.S. Cl.
CPC .......... *H04L 63/20* (2013.01); *H04L 63/0823* (2013.01); *H04L 63/101* (2013.01); *Y04S 40/162* (2013.01); *Y04S 40/164* (2013.01); *Y04S 40/24* (2013.01)

(58) Field of Classification Search
USPC ............................................................ 726/1
See application file for complete search history.

(56) References Cited

U.S. PATENT DOCUMENTS

| | | | |
|---|---|---|---|
| 2014/0059193 A1* | 2/2014 | Thilderkvist | .... G05B 19/41855 709/222 |
| 2015/0172124 A1* | 6/2015 | Piccinini | ................. H04L 41/12 307/11 |

* cited by examiner

METHOD, A SERVER AND A CLIENT PROVIDING SECURED COMMUNICATION IN A POWER DISTRIBUTION COMMUNICATION NETWORK

FIELD OF THE INVENTION

The invention relates to a method, a server and a client for providing secured communication in a power distribution communication network.

BACKGROUND

In an implementation capable of secure communication, the messages are checked by their source or destination for fraudulent or erroneous addresses. Newly installed devices have to be programmed with communication parameters that have been tested and need to be kept safe from unauthorized access. However, re-programming such devices makes the installation of the devices cumbersome and the network inflexible.

SUMMARY

The object of the invention is thus to provide flexible and secured communication setup when installing new devices in a power distribution communication network.

The main idea of the invention is a method to provide secured communication in a power distribution communication network (100) comprising
- upon receipt of a request for the insertion of a new device to the power distribution communication network,
- checking unique ID of the new device received in the request against a list of stored new devices or suppliers stored in a data storage,
- upon finding a matching entry, evaluating predetermined device or supplier certificate against a certificate received in the request,
- upon validation of the received certificate, checking to determine if the new device will fit into a predetermined network topology or relation table,
- configuring the power distribution communication network to include the new device in case the new device fits into the network topology or relation table.

Advantageously a stored network topology is updated, to define relations and rules for the devices, to define the communication and relation table and to download to the new device and the other devices the relation tables and processing rules.

Advantageously device specific information is looked up in the data storage and automatic rule based evaluation of the device specific information.

Advantageously the new device is rejected by sending respective information to other devices or by quietly ignoring the request.

Advantageously a log file is generated comprising information about the request and the result of the checks.

Advantageously the new device is rejected if a time limit is exceeded.

Advantageously an alarm is sent to a client in case any of the checks fails.

The invention concerns a respective server and client as well.

Further developments of the invention can be gathered from dependent claims and the following description.

BRIEF DESCRIPTION OF THE FIGURES

In the following the invention will be explained further making reference to the attached drawings.

DESCRIPTION OF THE EMBODIMENTS

Figure 1:
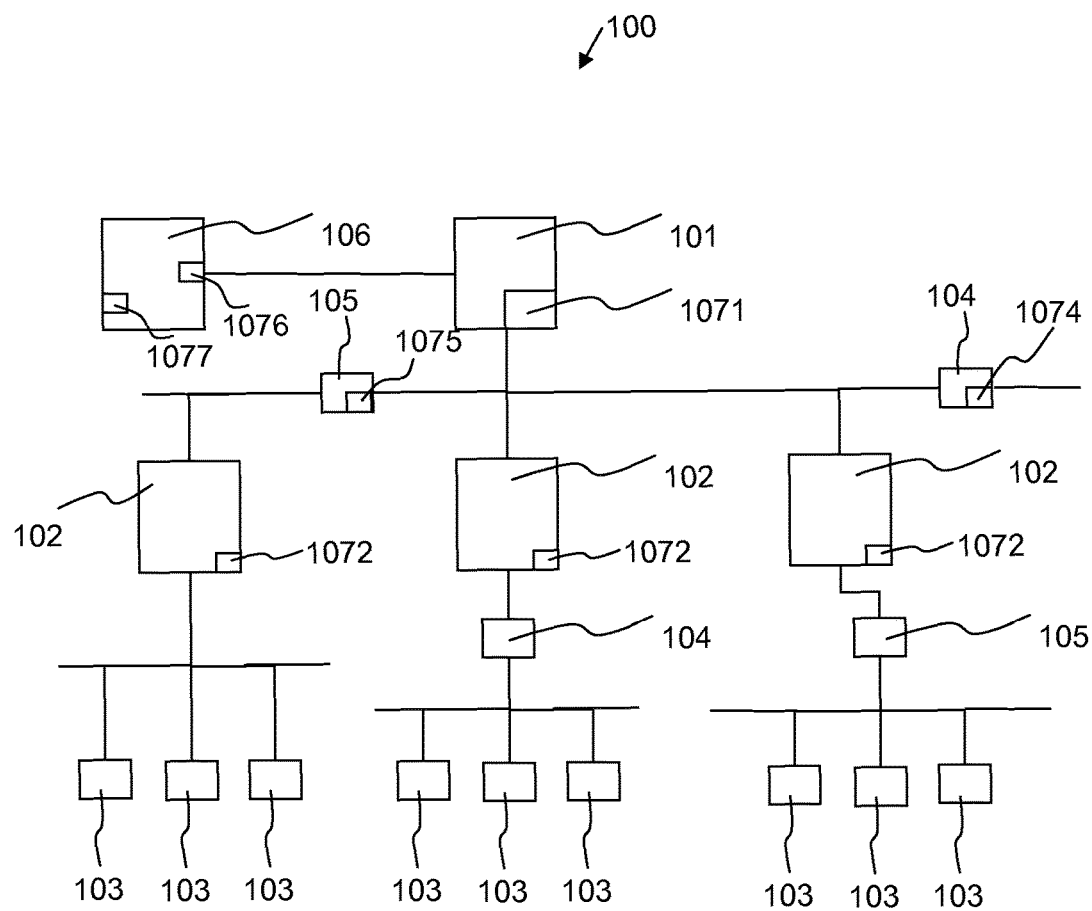
FIG. 1 schematically shows a part of a power distribution communication network.

FIG. 1 depicts part of a power distribution communication network 100 and devices 101, 102, 103, 104, 105, 106. The power distribution network itself or the power distribution communication network 100 may be organized in levels n hierarchically. In the example a cell of the power distribution net is depicted in FIG. 1 comprises n=3 levels. The top level n=1 may comprise of device 101, the second level n=2 may comprise of several devices 102 and the third level n=3 may comprise of several devices 103.

The device 101 may be a primary substation connected with a central control system, e.g. a SCADA, 106. The central control system 106 might be part of the power distribution communication network 100 and/or to belong to the devices of the power distribution communication network 100 or not according to the implementation.

The central control system 106 might be connected to the depicted primary substation 101 via a data link, e.g. optical fiber connection, or any communication channel.

For illustrative reasons, only one device 101 is depicted. However, the power distribution communication network 100 may comprise more than one primary substation 101.

Devices 102 may be secondary substations. Alternatively or additionally devices 102 may comprise energy generating providers of conventional, for example coal, and/or renewable energy sources, in particular wind-farms, solar plants, biomass, water-power, energy storage means, pump storages. Any of the devices may be measurement points or distributed intelligence devices, such as devices for collecting local information, local control devices or processing decision points.

In the following, devices 102 are referred to in particular as being secondary substations. Devices 104 may be measurement points and devices 105 may be points comprising a local collection of information and/or local control and processing decision functions. The devices 105 may be termed for short distributed intelligence or distributed intelligence points 105.

Similarly as in regard of the primary substations 101, the power distribution network 100 might and usually will comprise a plurality of secondary substations 102, measurement points 104 and distributed intelligence points 105.

Furthermore, FIG. 1 depicts a plurality of devices 103 which might be energy consumers. The energy consumers 103 might be regarded as within or on the edge or outside of the power distribution (communication) network 100 and/or therefore to belong to the devices of the energy distribution communication network 100 or not.

Accordingly, depending on the implementation, the energy consumers 103 might take part of the implementation of the secured communication within the power energy distribution communication network 100 or not.

Additionally amongst the devices 103, further devices might appear which might also provide energy, in particular as renewable energy sources which might be implemented preferably in or in adjacency of the energy consumers, for example solar cells on the roofs of the houses etc. Further energy sources or any further devices might be part of the power distribution network and/or of the power distribution communication network 100 according to the implementation.

In an example a secured communication is implemented by providing a network topology of the power distribution communication network 100 which consists primarily in defining the number and the kind of devices being part of the power distribution communication network 100 and assigning a unique, in the sense of biunique ID, to each device. Furthermore in this example a connection topology file is provided which comprises in particular the network topology and a relation table including communication relations within the power distribution communication network 100 which are valid for a message to be authorized and therefore to be respected as valid. Furthermore a message including identifiers in particular an ID of the source device, an ID of the destination device and an ID of the type of the message is wrote by the source device, sent to the destination device and received and read by the destination device. The destination device checks based on the identifiers included in the message, in particular the ID of the source device, the ID of the destination device and the ID of the message type, if the message is authorized. This check is made by the destination device by a look-up into the connection topology file stored in the memory of the destination device to determine based on the knowledge of the source device ID, destination device ID and message type ID, if the specific source device has the right or authorization to send this type of message to the destination device which would be—at least in the regular case, if the message is authorized—the device itself receiving the message.

As the connection topology file comprises in particular the relation table which includes comprehensively and exclusively all authorized communication relations, this means which devices are authorized to send which kind of message at what time to which kind of devices and as based on the IDs included in the message, the destination device knows the source, message type and authorized destination, the device receiving the message can determine, if it is correct that the source device sent this type of message at the time the message was sent to itself as the right authorized destination device and if the message is therefore authorized, correct and valid and has to be respected, for example the command included therein executed.

Figure 2:
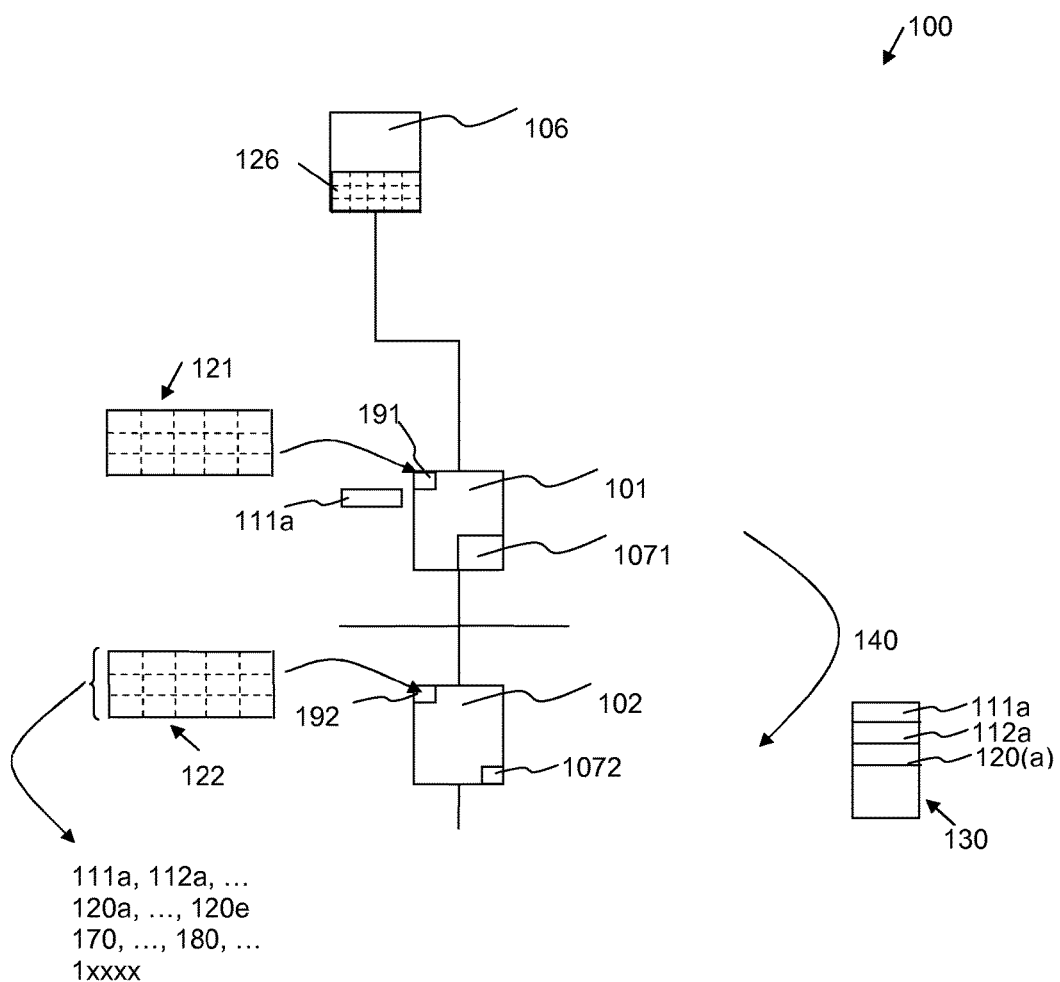
FIG. 2 schematically shows a part of a power distribution communication network.

In a preferred exemplary embodiment will be the source device is a primary substation 101 of the power distribution communication network 100 and the destination device in this embodiment is a secondary substation 102 of the power distribution communication network 100. The primary substation 101 and the secondary substation 102 are depicted in FIGS. 1 and 2. The substations might comprise transformer coils which transform the voltage from a higher level to a lower level.

While FIG. 1 depicts an overview of the power distribution communication network 100, FIG. 2 shows a more detailed part of the power distribution communication network 100 and depicts also steps of the method to provide secured communication therein and further detailed elements of the power distribution communication network 100 and/or of the method, e.g. steps of the method to provide secured communication within the power distribution communication network 100.

The primary substation 101 has a unique ID 111a, which might be assigned to the device e.g. the housing of the primary substation 101 and/or preferably and in particular stored in the connection topology file 121 of the primary substation 101 which is preferably stored in the memory 191 of the primary substation 101.

The same implementation applies for the further devices of the energy distribution communication network 100, in this example in particular for the secondary substation 102 with the ID 112a, the connection topology file 122 and the memory 192 of the secondary substation 102.

The primary substation 101 will send a message 130 to the secondary substation 102, the sending step is symbolized by the arrow 140. The message 130 will be checked by the secondary substation 102, if the message is authorized, in particular if the sending device is an authorized source at all, this means if there is/exists actually a sending device as it appears in the message, if the sending device is an authorized source device to send messages at all, in particular if the sending device is authorized to sent this type of message, if this kind of message is valid at all, if the secondary substation 102 itself is a authorized destination device at all and in particular for this type of message sent, if the primary substation 101 is authorized to sent this type of message to the actual destination device, namely to the secondary substation 102, and in particular at the time, in particular time of the day and/or date the primary substation 101 actually sent the message 130 to the secondary substation 102.

All this checking will be performed by the secondary substation 102 based on the identifiers 111a, 112a and 120 included in the message 130 with reference to and by comparing the identifiers with the information stored in the memory 192 of the secondary substation 102, namely with the data in the connection topology file stored therein. By the data in the connection topology file 122, the secondary substation 102 will determine if the above described sending of said type of message 130 from the primary substation 101 to the secondary substation 102 at this moment of time was correct, in order, authorized, valid and has to respect, e.g. executed.

In more detail, the connection topology file 122 stored in the memory 192 of the secondary substation 102, for short the connection topology file 122 of the secondary substation 102, includes the topology of the power distribution network, in particular of the power distribution communication network 100.

The topology of the power distribution communication network 100 includes all devices of the power distribution network 100 and in case the communication devices are implemented as separate devices assigned to the power distribution devices the communication devices and their association to the power distribution devices.

The devices are identified with a biunique ID, which is inserted in the sent message 130 in the respective ID field. As it can be seen in FIG. 2, the message 130 comprises—in the field of the destination device ID—the ID 111a. The secondary substation 102 will read the ID 111a and will look in its connection topology file 122 and determine the primary substation 101 as the sending device as the ID 111a unambiguously, uniquely, is assigned to and only to the primary substation 101 (which furthermore preferably has only this single ID as device ID of the power distribution communication network 100 and could not appear for example in another message with another alias ID).

The secondary substation 102 will then check that the message 130 has been correctly sent to the indicated destination device. For this check the secondary substation 102 will read the destination device ID field of the message 130 and will read the ID 112a. The secondary substation 102 knows, at least by its connection topology file and/or by looking at its ID field 112*a* associated with the secondary substation 102 and in particular stored in the connection topology file memory 192 or in another memory of the secondary substation 102, that the ID 112*a* is the ID of the secondary substation 102, itself, because to and only to the secondary substation 102 the ID 112*a* is assigned.

The secondary substation 102 will then look at the message type field in the message 130 and will read the ID 120, more precisely the ID 120*a* for a particular type of message, for example a switch order type. Beside the switch order type 120*a* the definition of message types stored in the connection topology file and used within the secured communication might be measurement type 120*b*, status type 120*c*, control type 120*d* and process/application type 120*e*. Further message types might be determined and implemented equivalently. In this exemplary embodiment, the secondary substation 102 will know by look-up into the connection topology file 122 that the ID 120*a* stands actually for a switch order message type. Therefore, as the message ID is unique, the message 130 received must be a switch order message.

Consecutively, the secondary substation 102 will check the time of the sending of the message 130 by looking into its time chronograph or of any time indicating means to which the secondary substation 102 has access. Finally, the secondary substation 102 will look into its connection topology file 122, if the primary substation 101 is an authorized source device to send this type 120*a* of message 130 at the moment it did to the secondary substation 102 as authorized destination device for this type 120*a* of message 130.

The connection topology file comprises besides or among (depending on the used terminology and definitions) the network topology in the narrower sense all kind of authorized communication relations, which indicate which devices as source devices are authorized to send which types of messages at what moment of time to which devices as destination devices and accordingly which messages are authorized messages. The data stored in a connection topology file are symbolized by the references signs 111*a* . . . , 120*a* . . . , 170 . . . , 180 . . . and 1*xxx*, wherein the references signs 170 . . . might refer to authorized communication relations and 180 . . . might refer to time parameters. 1*xxx* stands for further data stored in the connection topology file. The structure and/or references of the data included in the connection topology file and of the file itself might vary. In FIG. 2, the references signs depicted in detail for connection topology file 122 apply to the connection topology file 121 equivalently and to any connection topology file of a device of the power distribution communication network 100.

The connection topology file might have exactly the same content for every device having such a file or the connection topology file might have a content adapted to the device, for example a particular network topology file might not include data which are not relevant for a device indicating e.g. communication relations which are not of interest to said device. While advantageously, each device of the communication topology network has a connection topology file implemented in or adjacent to the device, alternatively the connection topology file might be implemented in one or more centralized elements to which the authorized devices have access.

To implement the devices and a method of providing secured communication, each device 101, 102, 104, 105 of the power distribution communication network 100 preferably comprises a communication unit 1071, 1072, 1074, 1075 in particular for sending and receiving a message, respectively, and for further processing as will be described in more detail below. The communication units 1071, 1072, 1074, 1075 might be integrated into the respective device 101, 102, 104, 105 (FIG. 1) or adjacent to the device 101, 102, 104, 105. The communication between the devices 101, 102, 104, 105 of the power distribution communication network 100 might be provided, in particular by means of their respective communication units 1071, 1072, 1074, 1075, by means of wireless communication, in particular mobile communication including GPRS, Wimax, CDMA or LTE, preferably PMR, or by means of wireline communication, in particular Powerline, preferably MV powerline.

The communication units 1071, 1072, 1074, 1075 may be implemented as a single unit, a stand-alone device, or within a database, integrated in a computer and/or within a computer network. The communication units 1071, 1072, 1074, 1075 may be implemented through the use of hardware, software and/or hardware capable of executing software in association with appropriate software.

More specifically, the communication units 1071, 1072, 1074, 1075 can be comprised or implemented by circuit-based processes, including possible implementation as a single integrated circuit, such as an ASIC (=Application Specific Integrated Circuit) or such as an FPGA (=Field Programmable Gate Array), a multi-chip module, a single card, or a multi-card circuit pack. The functions of the communication units 1071, 1072, 1074, 1075 may be implemented as processing blocks in a software program. Such software may be employed in a digital signal processor, micro-controller, or general-purpose computer implemented as a single device or integrated in a computer network.

The communication units 1071, 1072, 1074, 1075 may comprise program code embodied in tangible media, such as magnetic recording media, optical recording media, solid state memory, floppy diskettes, CD-ROMs, hard drives, or any other machine-readable storage medium, wherein, when the program code is loaded into and executed in the communication units 1071, 1072, 1074, 1075, the communication units 1071, 1072, 1074, 1075 become apparatuses used for practicing the invention.

In an exemplary embodiment, the primary substation 101 comprises the respective communication unit 1071 and secondary substation 102 comprises the respective communication unit 1072 (FIG. 2). The primary substation 101, preferably by means of its communication unit 1071, will access the write protected connection topology file 121 stored in the memory 191 of primary substation 101 and will provide the message 130 comprising the identifiers 111*a*, 112*a*, 120*a*. The primary substation 101, in particular by the communication unit 1071, sends 140 the message 130 to the secondary substation 102, which, in particular by the communication unit 1072 of secondary substation 102, will receive the message 130. Secondary substation 102, in particular by means of the communication unit 1072, will check, if the message 130 is an authorized message, in particular, if the IDs 111*a*, 112*a*, 120*a* of the message 130 and the data 111*a* . . . 1*xxx* included in the write protected connection topology file 122 of the secondary substation 102 are consistent, and will generate a master alarm, when detecting an un-authorized message, in particular when detecting an inconsistency between the one or more identifiers 111*a*, 112*a*, 120*a* of the message 130 and the data 111*a* . . . 1*xxx* included in the write protected connection topology file 122.

This means that messages will be send depending on:
Message source ID
Message destination ID
Message type ID Each device in the call will check the identity with the network topology and generates alarm at inconsistence.

Control commands are defined on the next higher grid level as rules and distributed and stored within the lower grid level. The rule chain spans vertically from the wide area network control over primary and secondary substations down to the home control box. Status information is transmitted back using the reverse chain direction.

Each level in the grid generates based on these rules, the local control and information and works independently until new rules are received. Ultimate goal is the achievement of balanced energy flow and operation conditions across all levels of the energy grid.

In this context, it has to be mentioned that a manifold of un-authorized messages could be imagined. For example, the primary substation 101 could be authorized to send a particular message type 120, but not to the second substation 102. As another example, the secondary substation 102 is authorized to receive a particular type 120 of message 130 only from one or more particular devices as source devices according to the connection topology file, but not from the primary substation 101 as source device.

As a further example, the secondary substation 102 will determine that the primary substation 101 is authorized to sent the message type 120 only during the night time from 8 o'clock in the evening to 8 o'clock in the morning, for example a measurement message with message type 120b for example. In this case, the secondary substation 102 will know that a message 130 with message type 120b sent during day time for example at 10 o'clock a.m. cannot be an authorized message if the ID of the source device refers to the primary substation 101. Therefore, the secondary substation 102 will know that a message 130 with message type 120b with the ID 111a referring to primary substation 101 sent at 10 o'clock a.m. cannot actually be sent from the primary substation 101 in order. This means said message 130 is ought to be sent based on manipulation.

For example, in a man-in-the-middle attack as mentioned above, a fraudulent intruder might have inserted the message 130 into the communication flow to secondary substation 102.

The intruder may have indicated falsely the primary substation 101 as the source device of the message, this means the indication of the primary substation 101 is a fake and an attempt to cause the secondary substation 102 to implement a processing which is not authorized. In the case of the measurement message type 120b, the secondary substation 102 might only waste processing resources when prosecuting the un-authorized message with message type 120b as a measurement message.

However, if the message 130 was actually a switch order type 120a message 130 instructing the secondary substation to switch off a particular device or the shut down itself, the negative consequences might be important. For example, because of the shutdown of the secondary substation 102 caused by an authorized switch order type 120a message, further, in particular, adjacent secondary substations 102 of the power distribution network might be overloaded, which could lead to burning devices if the voltage exceeds to a dangerous level. In a less dangerous situation which is still completely unpleasant and has to be avoided likewise, due to the shutdown of the secondary substation 102 energy consumers might be without energy supply and will have to suffer a black-out of energy consuming devices which for example for hospitals despite their emergency batteries still is a bad situation.

However, in the exemplary embodiment, the secondary substation 102 will determine that the message 130 with message type 120a appearing to be sent by primary substation 101 is an un-authorized message and will not prosecute the switch order.

In the opposite, the secondary substation 102 will cause an alarm sent to particular devices or to a plurality of devices and/or to the central control system 106 as the SCADA mentioned above. The alarm might be a master alarm depending on the used terminology or on the implementation of the alarm.

To enable distribution automation as an ad-hoc (plug and play) installation in a very high protected and secured network including self configuration, the power distribution communication network 100 is set up, e.g. by programming and storing trust information e.g. in a data storage 126 of a control or trust center of a utility, e.g. the central control system 106. The trust information for example comprises:

a network diagram (e.g. abovementioned network topology)

a network component relation, functionality (e.g. abovementioned relation table)

a functional definition of the different levels and relations (e.g. as rules defining function or feature description of the respective device as well as their hierarchical position in the power distribution grid)

information about possible communication relations and channels (e.g. including above mentioned communication relations within the power distribution communication network 100 which are valid for a message to be authorized and therefore to be respected as valid)

storage information of new certified devices or certified suppliers. The information includes for example information about features of certified devices or the unique device ID of certified devices or of their suppliers. The information is preferably stored in a digital certificate comprising the following elements:

a) a serial number to uniquely identify the certificate,
b) a subject identifying the device or supplier,
c) a signature algorithm used to create the signature,
d) the actual signature to verify that the certificate came from the issuer,
e) information about the issuer, e.g. the entity that verified the information and issued the certificate,
f) a Valid-From date, i.e. the date the certificate is first valid from,
g) a Valid-To date, i.e. the expiration date of the certificate,
h) a key-usage information, e.g. the purpose of the public key (e.g. encipherment, signature, certificate signing . . . ),
i) the public key of the respective device,
j) a thumbprint algorithm e.g. the algorithm used to hash the public key certificate,
k) a thumbprint: e.g. the hash itself, used as an abbreviated form of the public key certificate.

The digital certificate may not comprise all of abovementioned elements or comprise additional elements as well.

As described above each of the devices has a unique ID. In the example the unique ID is linked in the data storage 126 to the respective trust information.

In the example the control or trust center and data storage are part of above described central control system 106.

Alternatively a separate trust center may be used. In this case the trust center is connectable to the power distribution communication network 100. Optionally utility specific control or trust center addresses may be used.

In any case the control or trust center is the only one access point for new devices and for access to the utility information.

Figure 3:
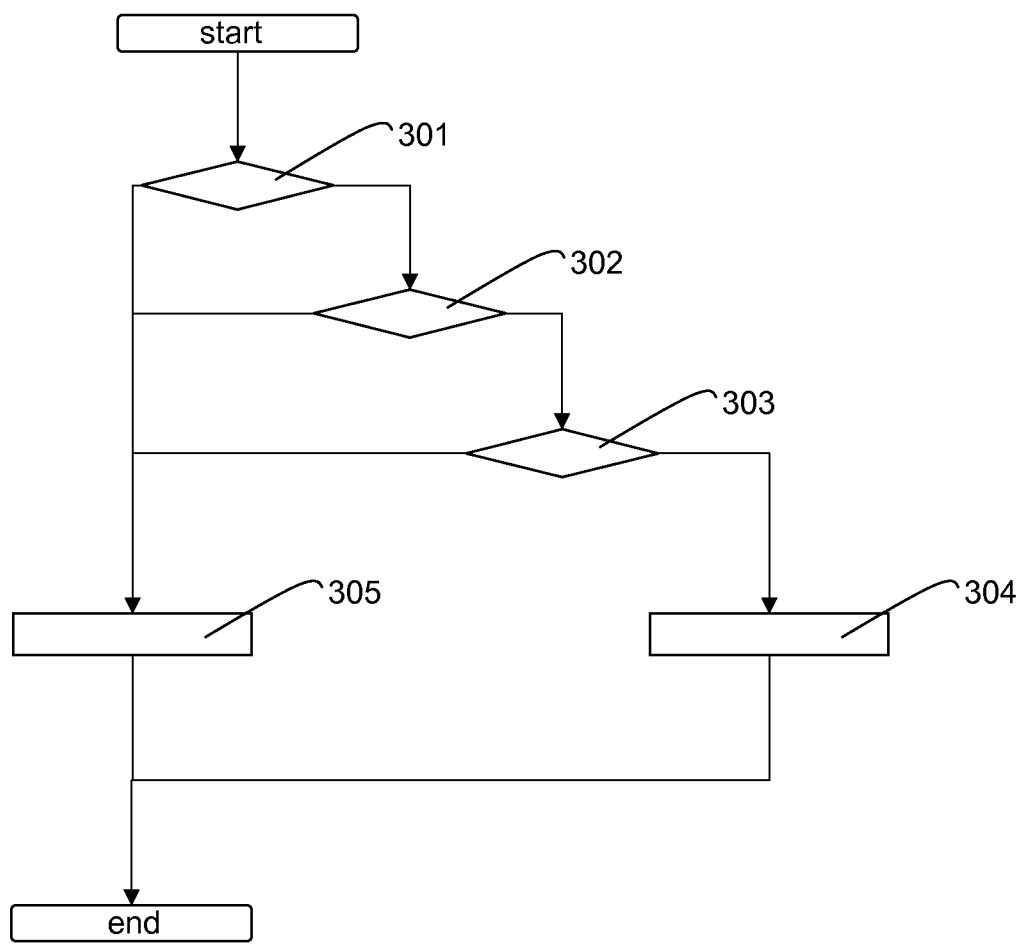
FIG. 3 schematically shows a flow chart.

To ensure this, and to achieve stability under the use of significant volatile decentralized production environment and a better power grid management a method for integrating new devices into the existing environment is explained below making reference to FIG. 3.

The method supports local energy autonomy in case that higher network levels are cut or are having difficulties to deliver the full amount of energy needed during a time frame.

Furthermore it allows for realization of a robust intelligent power grid. Based on its decentralized character it is highly saleable avoiding huge a priori investments in large control centers.

The method is executed for example whenever a new device e.g. an intelligent electronic device, well known as IED, is installed, i.e. connected to the power distribution communication network 100. The IED may be any of aforementioned devices, e.g. a first substation 101 or secondary substation 102.

Previously to executing the method, the new device is configured, e.g. by programming and storing:
  location information (e.g. geographic sub-station location according to the global positioning system coordinates, rack location or number within a substation, . . . )
  functionality information (e.g. information about available features like measurement gear, reporting interfaces, powerswitch, . . . .
  certification information (e.g. a digital certificate as the abovementioned digital certificates and comprising elements suitable to be verified or authenticated as valid upon access the control or trust center). The certification information for example comprises a private key matching the public key stored for this device or it's supplier in the data storage 126.

After installation of the new device, e.g. by connecting it to the power distribution communication network 100, the above mentioned grid protection mechanism recognizes this new device as Invalid and will send out above mentioned alarm.

This triggers that there will be no relation or communication set up with this new device, except for the connection to above mentioned control or trust center. This means that the new device can only connect to the control or trust center for processing the new device by setting up the connection to the control or trust center via the power distribution communication network 100.

The method for example starts whenever a connection request by a new device is detected by the control or trust center. The connection request comprises in the example the unique ID and certificate of the requesting device.

Afterwards a step 301 is executed.

In step 301, a check of the unique ID against the list of stored new devices or suppliers in the data base is performed.

In case a matching entry is found, a step 302 is executed. Otherwise a step 305 is executed.

In step 302 the device or supplier certificate is evaluated against the received certificate. In case the received certificate is validated a step 303 is executed. Otherwise the step 305 is executed.

In step 303 a check is performed to determine if the new device will fit into the network topology or relation table. This may comprise looking up device specific information in the data storage 126 and of an automatic rule based evaluation of the device features, the current network topology or relation table stored in the data storage 126. In case the new device fits into the network topology or relation table a step 304 is executed. Otherwise the step 305 is executed.

In step 304 the network is configured to include the so verified device. This means for example, to update the stored network topology, to define relations and rules for the devices, to define the communication and relation table and to download to the new device and the other devices the relation tables and processing rules.

This means that at this time the new device becomes legal, accepted in the grid and becomes fully operational.

Afterwards the method ends.

In step 305 the new device is rejected and is not connected to other devices of the power distribution communication network 100. The step 305 may include sending respective information to other devices or to quietly ignore the request. A log file may be generated optionally. Furthermore optionally this step is also executed if any of the aforementioned steps exceeds a time limit. In both cases optionally the field forces, e.g. workers of the utility, are alarmed e.g. by electronic mail, to physically remove the new device. The alarm may include information about the rejected device, e.g. the location. This information is determined for example by a lookup of information linked to the device ID in the data storage 126.

Afterwards the method ends.

Optionally in an additional step the automatic acceptance or rejections may be subjected to human review, e.g. by triggering a prompt on or sending an electronic mail with information about the connection request to a client device.

After successfully adding or rejecting the new device as described above a protected and encrypted communication relation and network topology with identified legal source and destination of message types and commands is defined for the whole power distribution grid.

Preferably when adding a new device information about the new device is stored in a write protected memory in each power network communication device.

Additional steps for removing any devices in the power distribution grid or power distribution communication network 100 are executed for example as part of aforementioned method or steps of a separate method.

According to these additional steps, a removal of a device is detected by receiving a sign off message sent from the respective device before it's removal or upon a detection of a missing, i.e. removed, device by other devices of the power distribution communication network 100.

Upon detection of this removal of a device, the network topology or relation table stored in the data storage 126 in the control or trust center and all other devices are updated as described above. This means that removing a device triggers a communication and relation break. This event will start the sequence of:
  setting aforementioned alarm,
  forcing the n+1 level and neighbour communication to be reconfigured,
  forcing new n+1 level relationship and rule definitions,
  updating the network diagram or other devices.

Likewise for replacement of a device the removal and insert of a replacement device is handled as described above.

The steps of aforementioned methods may be performed in any other order. Not all of the steps have to be performed in all implementations.

A preferred implementation comprises a server 106 for providing secured communication in the power distribution communication network 100. The server 106 is for example the central control system 106 described above.

The server 106 in this example comprises a transceiver 1076, i.e. a receiver and a sender. For example the transceiver 1076 is implemented as described for communication units 1071, 1072, 1074, 1075 above.

The receiver is adapted to receive a request for the insertion of a new device to the power distribution communication network 100.

Furthermore the server 106 comprises a processor 1077 adapted to upon receipt of the request check e.g. according to aforementioned step 301, the unique ID of the new device received in the request against the list of new devices or suppliers stored in the data storage 126.

Furthermore the processor 1077 is adapted to upon finding a matching entry, evaluate, e.g. according to aforementioned step 302, the predetermined device or supplier certificate against the certificate received in the request.

Furthermore the processor 1077 is adapted to upon validation of the received certificate, check, e.g. according to aforementioned step 303, to determine if the new device will fit into a predetermined network topology or relation table.

The sender is adapted to configure, e.g. according to aforementioned step 304, the power distribution communication network 100 to include the new device in case the new device fits into the network topology or relation table.

The sender is preferably adapted to update a stored network topology, to define relations and rules for the devices, to define the communication and relation table and to download to the new device and the other devices the relation tables and processing rules.

The processor 1077 is preferably adapted to look up device specific information in the data storage 126 and to perform automatic rule based evaluation of the device specific information.

The sender is preferably adapted to reject the new device by sending respective information to other devices or by quietly ignoring the request.

The processor is preferably adapted to generate a log file comprising information about the request and the result of the checks. The log file is stored e.g. in the data storage 126.

The sender is preferably adapted to reject the new device if a time limit is exceeded.

The sender is preferably adapted to send an alarm to a client, e.g. the primary substation 101, the secondary substation 102 or any of the other devices 103, 104, 105 of the power distribution communication network 100 in case any of the checks fails.

Such client, e.g. any of the devices 101, 102, 103, 104, 105, is adapted for providing secured communication in the power distribution communication network 100 and comprises a sender, e.g. the respective communication unit 1071, 1072, 1073, 1074, 1075, adapted to send a request for the insertion of a new device to the power distribution communication network (100). This request preferably includes the unique ID of the new device and a certificate of the new device.

The client comprises a receiver, e.g. the respective communication unit 1071, 1072, 1073, 1074, 1075, adapted to receive a configuration of the power distribution communication network 100 including the new device.

Furthermore the client comprises a processor and storage adapted to store the respective information. The processor is not depicted separately. It may be a separate element, or part of the e.g. the respective communication unit 1071, 1072, 1073, 1074, 1075.

To improve robustness and avoid issues regarding aforementioned method is preferably repeated randomly during operation in another check or test. The respective devices are in this preferred embodiment adapted accordingly to start this method randomly. Additionally the device may be checked this way randomly or frequently for events like errors or manipulations. Upon detection of such event, the device in question may be automatically removed from the power distribution communication network 100 as describe above.

The description and drawings merely illustrate the principles of the invention. It will thus be appreciated that those skilled in the art will be able to devise various arrangements that, although not explicitly described or shown herein, embody the principles of the invention. All statements herein reciting principles, aspects, and embodiments of the invention, as well as specific examples thereof, are intended to encompass equivalents thereof.

The functions of the various elements shown in the figures, including any functional blocks labelled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that the flow chart represents various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for providing secured communication in a power distribution communication network, comprising:

upon receipt of a request for an insertion of a new device to the power distribution communication network, checking a unique identifier of the new device received in the request against a list of stored new devices or suppliers stored in a data storage;

upon finding a matching entry, evaluating a predetermined device or supplier certificate against a certificate of the new device received in the request;

upon validation of the received certificate, checking to determine if the new device will fit into a predetermined network topology or a relation table that indicates which messages are authorized messages, wherein the checking to determine comprises looking up device specific information in the data storage and comprises an automatic rule based evaluation of features of the new device, the current network topology or the relation table stored in the data storage; and configuring the power distribution communication network to include the new device in case the new device fits into the network topology or the relation table by updating the network topology to define relations and rules for devices, to define the communication and the relation table and to download the relation tables and processing rules to the new device and the other devices of the power distribution communication network.

2. The method according to claim 1, further comprising updating a stored network topology to define relations and rules for the devices, to define the communication and the relation table, and to download the relation tables and the processing rules to the new device and the other devices.

3. The method according to claim 1, further comprising looking up the device specific information in the data storage and the automatic rule based evaluation of the device specific information.

4. The method according to claim 1, further comprising rejecting the new device by sending respective information to the other devices or by quietly ignoring the request.

5. The method according to claim 1, further comprising generating a log file comprising information about the request and the result of the checks.

6. The method according to claim 1, further comprising rejecting the new device if a time limit is exceeded.

7. The method according to claim 1, further comprising sending an alarm to a client in case any of the checks fail.

8. A server for providing secured communication in a power distribution communication network, comprising:
a receiver adapted to receive a request for an insertion of a new device to the power distribution communication network;
a processor adapted to, upon receipt of the request, check a unique identifier of the new device received in the request against a list of new devices or suppliers stored in a data storage;
the processor adapted to, upon finding a matching entry, evaluate a predetermined device or supplier certificate against a certificate of the new device received in the request;
the processor adapted to, upon validation of the received certificate, check to determine if the new device will fit into a predetermined network topology or a relation table adapted to indicate which messages are authorized messages, wherein the check to determine comprises looking up device specific information in the data storage and comprises an automatic rule based evaluation of features of the new device, the current network topology or the relation table stored in the data storage; and
a sender adapted to configure the power distribution communication network to include the new device in case the new device fits into the network topology or the relation table by updating the network topology to define relations and rules for devices, to define the communication and the relation table and to download the relation tables and processing rules to the new device and the other devices of the power distribution communication network.

9. The server according to claim 8, wherein the sender is adapted to update a stored network topology, to define relations and rules for the devices, to define the communication and the relation table, and to download the relation tables and the processing rules to the new device and the other devices.

10. The server according to claim 8, wherein the processor is adapted to look up the device specific information in the data storage and perform the automatic rule based evaluation of the device specific information.

11. The server according to claim 8, wherein the sender is adapted to reject the new device by sending respective information to the other devices or by quietly ignoring the request.

12. The server according to claim 8, wherein the processor is adapted to generate a log file comprising information about the request and the result of the checks.

13. The server according to claim 8, wherein the sender is adapted to reject the new device if a time limit is exceeded.

14. The server according to claim 8, wherein the sender is adapted to send an alarm to a client in case any of the checks fail.

15. A client for providing secured communication in a power distribution communication network, comprising:
a sender adapted to send a request for an insertion of the client to the power distribution communication network, including a unique identifier of the client and a certificate of the client;
a receiver adapted to receive a configuration of the power distribution communication network including the client, to indicate which messages are authorized messages; and
a processor adapted to store the configuration of the power distribution communication network including the client, indicating which messages are authorized messages into a predetermined network topology or relation table by updating the network topology to define relations and rules for devices, to define the communication and the relation table and to download the relation tables and processing rules to a new device and other devices of the power distribution communication network.

* * * * *